United States Patent
Choi et al.

(10) Patent No.: US 10,612,176 B2
(45) Date of Patent: Apr. 7, 2020

(54) CLOTHING TREATMENT DEVICE

(71) Applicant: LG ELECTRONICS INC., Seoul (KR)

(72) Inventors: Kahyung Choi, Seoul (KR); Youngho Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 335 days.

(21) Appl. No.: 15/554,945

(22) PCT Filed: Mar. 3, 2016

(86) PCT No.: PCT/KR2016/002136
§ 371 (c)(1),
(2) Date: Aug. 31, 2017

(87) PCT Pub. No.: WO2016/140531
PCT Pub. Date: Sep. 9, 2016

(65) Prior Publication Data
US 2018/0087207 A1    Mar. 29, 2018

(30) Foreign Application Priority Data
Mar. 3, 2015   (KR) .................. 10-2015-0029767

(51) Int. Cl.
*D06F 23/04*  (2006.01)
*D06F 33/02*  (2006.01)
(Continued)

(52) U.S. Cl.
CPC ............ *D06F 37/245* (2013.01); *D06F 23/04* (2013.01); *D06F 33/00* (2013.01); *D06F 37/24* (2013.01);
(Continued)

(58) Field of Classification Search
CPC .......... D06F 23/04; D06F 33/02; D06F 37/24; D06F 37/245; D06F 37/304;
(Continued)

(56) References Cited

U.S. PATENT DOCUMENTS

| 2013/0233028 A1* | 9/2013 | Naber | F16F 15/363 |
| | | | 68/13 R |
| 2013/0312464 A1* | 11/2013 | Davis | F16F 15/366 |
| | | | 68/212 |
| 2013/0319056 A1* | 12/2013 | Lee | D06F 17/10 |
| | | | 68/18 F |

FOREIGN PATENT DOCUMENTS

| CN | 2357030 | 1/2000 |
| KR | 10-2001-0010616 | 2/2001 |

(Continued)

OTHER PUBLICATIONS

Wei, "CN2357030 English Machine Translation.pdf", Jan. 5, 2000—Machine translation from Espacenet.com.*

(Continued)

*Primary Examiner* — Levon J Shahinian
(74) *Attorney, Agent, or Firm* — Ked & Associates, LLP

(57) ABSTRACT

The present invention relates to a clothing treatment device comprising: a cabinet including a door through which laundry is put in and taken out; a tub provided inside the cabinet so as to store wash water; a drum rotatably provided inside the tub so as to accommodate the laundry; a balancer provided so as to be integrally rotatable with the drum, and supplying water to the inside thereof so as to maintain a dynamic balance of the drum; and a water supply part for supplying water to the balancer, wherein the balancer includes a draining part provided so as to drain water inside the balancer by a siphoning phenomenon when water of a certain water level or more is supplied to the inside of the balancer.

20 Claims, 10 Drawing Sheets

(51) Int. Cl.
*D06F 37/24* (2006.01)
*D06F 37/30* (2020.01)
*D06F 39/08* (2006.01)
*F16F 15/16* (2006.01)
*F16F 15/167* (2006.01)
*D06F 33/00* (2020.01)

(52) U.S. Cl.
CPC .......... *D06F 37/304* (2013.01); *D06F 39/083* (2013.01); *D06F 39/088* (2013.01); *F16F 15/16* (2013.01); *D06F 2222/00* (2013.01); *F16F 15/167* (2013.01)

(58) Field of Classification Search
CPC .. D06F 39/083; D06F 39/088; D06F 2222/00; F16F 15/16; F16F 15/167
USPC ............... 68/12.06, 23.2, 23.3, 132, 208
See application file for complete search history.

(56) References Cited

FOREIGN PATENT DOCUMENTS

| KR | 10-0296285 | 8/2001 |
|---|---|---|
| KR | 10-2005-0050262 | 5/2005 |
| KR | 10-2013-0080222 | 7/2013 |

OTHER PUBLICATIONS

International Search Report dated Apr. 29, 2016 issued in Application No. PCT/KR2016/002136 (with English Translation).

\* cited by examiner (a)

(b)

(c)

(a)

(b)

(c)

(a)

(b)

(a)

(b)

(c)

CLOTHING TREATMENT DEVICE

CROSS-REFERENCE TO RELATED PATENT APPLICATIONS

This application is a U.S. National Stage Application under 35 U.S.C. § 371 of PCT Application No. PCT/KR2016/002136, filed Mar. 3, 2016, which claims priority to Korean Patent Application No. 10-2015-0029767, filed Mar. 3, 2015, whose entire disclosures are hereby incorporated by reference.

TECHNICAL FIELD

The present invention relates to a laundry treatment apparatus.

BACKGROUND ART

A conventional laundry treatment apparatus includes a cabinet defining the external appearance thereof, a tub provided in the cabinet, a drum rotatably provided in the tub for washing laundry, and a motor having a shaft fixed to the drum via the tub for rotating the drum.

The drum may be rotated without dynamic equilibrium or dynamic balance depending on the position of the laundry in the drum.

Dynamic balance means the state in which the centrifugal force generated when a body of rotation is rotated or a moment generated by the centrifugal force becomes zero (0) with respect to the axis of rotation thereof. For a rigid body, dynamic balance is maintained if mass distribution is uniform about the axis of rotation thereof.

In the laundry treatment apparatus, therefore, dynamic balance may be understood as the case in which, when the drum is rotated in the state in which laundry is placed in the drum, the mass distribution of the laundry is within an allowable range about the axis of rotation of the drum (the case in which the drum is rotated while vibrating within an allowable range).

In the laundry treatment apparatus, on the other hand, dynamic unbalance is the state in which mass distribution is not uniform about the axis of rotation of the drum during the rotation of the drum, which occurs when laundry is not uniformly distributed in the drum.

When the drum is rotated in the unbalanced state thereof, the drum vibrates, and the vibration of the drum is transmitted to the tub or to the cabinet, whereby noise is generated.

There is a conventional laundry treatment apparatus including a balancing unit for solving the problem of unbalance of a drum. The balancing unit included in the conventional laundry treatment apparatus is a ball balancer or a fluid balancer having a ball or a fluid provided in a housing fixed to the drum.

The ball balancer or the fluid balancer included in the conventional laundry treatment apparatus is configured such that, when the rotational track of the drum is irregular due to laundry that causes unbalance, the ball or the fluid moves in the direction opposite the position at which the laundry that causes unbalance is placed to control the balance.

The above-described unbalance control is effective in a steady state, in which the vibration of the drum is within a predetermined range. However, the unbalance control is not effective in a transient state, in which the vibration of the drum is transient (transient vibration). In addition, the conventional balancing unit has a structure in which, when unbalance occurs, it is difficult to immediately solve the unbalance (i.e. to actively solve the unbalance).

DISCLOSURE

Technical Problem

It is an object of the present invention to provide a laundry treatment apparatus configured such that a drum is temporarily stopped in an unbalanced state, in which laundry is not uniformly distributed, and water is supplied to a balancer to solve unbalance.

It is another object of the present invention to provide a laundry treatment apparatus including a structure that discharges water from a balancer provided at a drum after unbalance is solved.

It is another object of the present invention to provide a laundry treatment apparatus configured such that a drum is temporarily stopped and water is supplied to balancers provided at the upper part and the lower part of a drum to actively solve unbalance.

It is a further object of the present invention to provide a laundry treatment apparatus configured such that a drum is temporarily stopped and water is supplied to a balancer provided at at least one selected from between the upper part and the lower part of a drum to actively solve unbalance.

Technical Solution

In accordance with the present invention, the above and other objects can be accomplished by the provision of a laundry treatment apparatus including a cabinet including a door for withdrawing or introducing laundry, a tub provided in the cabinet for storing wash water, a drum rotatably provided in the tub for receiving laundry, a balancer provided so as to be rotatable integrally with the drum, the balancer being configured such that water is supplied into the balancer to maintain the dynamic balance of the drum, and a water supply unit for supplying water to the balancer, wherein the balancer includes a drainage unit for draining water from the balancer according to a siphon phenomenon when the water is supplied into the balancer up to a predetermined water level.

The balancer may be provided at at least one selected from between the upper part and the lower part of the drum.

The balancer may further include a housing for storing water, a partition for partitioning the interior of the housing, and an inlet provided in the housing for allowing water to be introduced into the housing therethrough.

The drainage unit may include an outer wall part defining the outer wall of the drainage unit, the outer wall part having a closed upper surface and an open lower surface, and an inner wall part provided in the outer wall part, the inner wall part having a closed upper surface and an open lower surface.

The partition may include a main partition provided to partition the interior of the housing and one or more sub partitions provided in each space partitioned by the main partition for preventing a phenomenon in which the water in the housing becomes biased.

The sub partitions may be provided such that the heights of the sub partitions increase in a rotational direction of the drum.

The water supply unit may include a water supply hose provided to supply water in the state in which the balancer is stopped, a water supply valve for controlling the amount of water that is supplied from the water supply hose, and a water supply guide provided to guide the water from the water supply hose into the balancer.

The water supply hose may be provided so as to communicate with a wash water supply unit for supplying wash water to the tub.

The laundry treatment apparatus may further include a liquid balancer or a ball balancer having liquid or a ball provided in the upper part or the lower part of the drum for maintaining the dynamic balance of the drum.

The axis of rotation of the drum may be perpendicular to the lower surface of the cabinet.

The drum may be configured such that the axis of rotation of the drum is perpendicular to the lower surface of the cabinet.

The drainage unit may be configured to drain the water from the balancer in a direction that is parallel to the direction of gravity.

The partition may extend in a direction that is perpendicular to the direction of gravity to partition the interior of the housing.

The laundry treatment apparatus may further include a driving unit for rotating the drum, wherein the driving unit may include a motor for providing a rotational force and a shaft rotatably provided at the motor, the shaft being provided in a direction that is parallel to the direction of gravity and being directly connected to one surface of the drum to rotate the drum.

The laundry treatment apparatus may further include a vibration unit for reducing vibration of the tub, wherein the vibration unit may include a first holder provided at one surface of the cabinet, a second holder provided at one surface of the tub, a connection provided to connect the first holder and the second holder, and an elastic member provided at the connection unit for providing an elastic force.

Advantageous Effects

The present invention has the effect of providing a laundry treatment apparatus configured such that a drum is temporarily stopped in an unbalanced state, in which laundry is not uniformly distributed, and water is supplied to a balancer to solve unbalance.

In addition, the present invention has the effect of providing a laundry treatment apparatus including a structure that discharges water from a balancer provided at a drum after unbalance is solved.

In addition, the present invention has the effect of providing a laundry treatment apparatus configured such that a drum is temporarily stopped and water is supplied to balancers provided at the upper part and the lower part of a drum to actively solve unbalance.

In addition, the present invention has the effect of providing a laundry treatment apparatus configured such that a drum is temporarily stopped and water is supplied to a balancer provided at at least one selected from between the upper part and the lower part of a drum to actively solve unbalance and thus to more effectively solve unbalance.

BEST MODE

Figure 1:
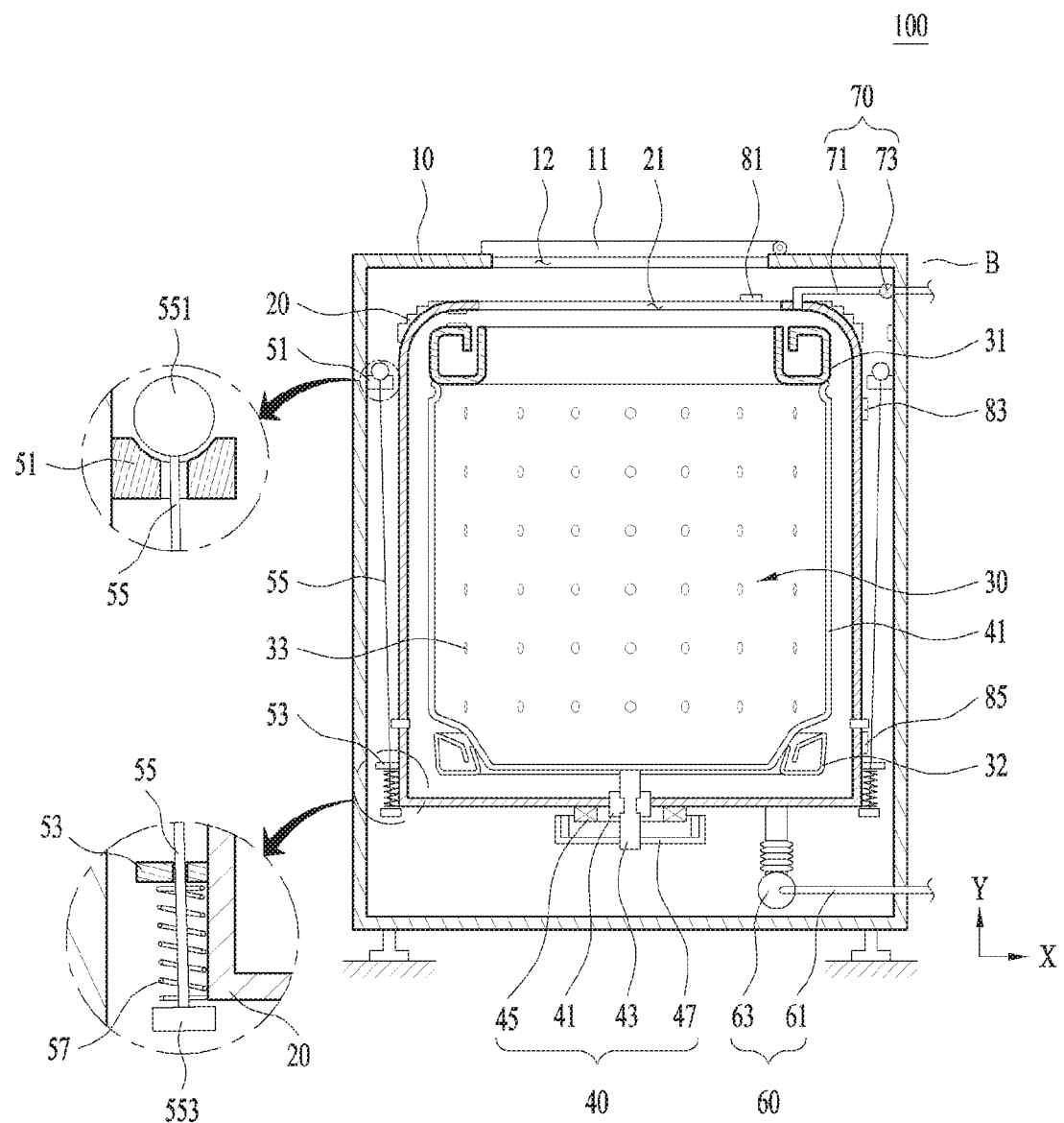
FIG. 1 is a view showing an example of a laundry treatment apparatus according to the present invention.

Hereinafter, exemplary embodiments of the present invention will be described with reference to the accompanying drawings. Meanwhile, the configuration of an apparatus or a control method of the apparatus, which will be described below, is merely given to describe the embodiments of the present invention, and is not intended to limit the scope of the present invention. The same reference numerals used throughout the specification refer to the same constituent elements.

FIG. 1 is a view showing an example of a laundry treatment apparatus according to the present invention.

Referring to FIG. 1, the laundry treatment apparatus according to the present invention may include a cabinet 10 defining the external appearance thereof, a tub 20 provided in the cabinet 10 for receiving wash water, and a drum 30 rotatably provided in the tub 20 for receiving laundry.

The axis of rotation of the drum 30 may be perpendicular to the lower surface of the cabinet 10.

The laundry treatment apparatus according to the present invention may further include a cabinet opening 12 formed in the top of the cabinet 10 for allowing laundry to be introduced or withdrawn therethrough and a door 11 hingedly provided at the top of the cabinet 10 for opening and closing the cabinet opening 12.

The laundry treatment apparatus according to the present invention may further include a tub opening 21 formed in the top of the tub 20 for allowing laundry to be introduced or withdrawn therethrough.

Although not shown, the laundry treatment apparatus according to the present invention may further include a drum opening (not shown) formed in the drum 30 for allowing laundry to be introduced or withdrawn therethrough via the cabinet opening 12 and the tub opening 21.

That is, a user may open the door 11, which is hingedly provided at the top of the cabinet 10, and may introduce laundry into the drum 30 through the cabinet opening 12, the tub opening 21, and the drum opening (not shown) in that order.

In addition, the laundry treatment apparatus according to the present invention may further include a water supply unit 70 for supplying water to the tub 20 and a drainage unit 60 for draining wash water from the tub 20.

The water supply unit 70 may include a water supply hose 71 and a water supply valve 73. One end of the water supply hose 71 may protrude outward from the cabinet 10 to receive water from outside, and the other end of the water supply hose 71 may communicate with one side of the tub 20 to supply the water supplied from outside to the tub 20. The water supply valve 73 may be provided in the water supply hose 71 to control the amount of water that is supplied to the tub 20 from the water supply hose 71.

The drainage unit 60 may include a drainage hose 61 and a drainage valve 63. One end of the drainage hose 61 may communicate with the tub 20 to drain wash water from the tub 20, and the other end of the drainage hose 61 may protrude outward from the cabinet 10 to discharge the wash water drained from the tub 20 out of the laundry treatment apparatus. The drainage valve 63 may be provided in the drainage hose 61 to control the amount of wash water that is discharged out of the laundry treatment apparatus from the drainage hose 61.

The drum 30 is rotatably provided. The laundry treatment apparatus according to the present invention may include a power unit 40 for rotating the drum 30.

The power unit 40 may include a shaft 43 communicating with the drum 30 for transmitting a rotational force from the power unit 40 to the drum 30, a stator 45 for generating a rotating magnetic field necessary to rotate the shaft 43, a rotor 47 rotatably provided on the outer circumferential surface of the stator 45 so as to be rotatable integrally with the shaft 43, and a bearing housing 43 for rotatably supporting the shaft 43.

The power unit 40 may be a direct-drive type power unit, in which the power unit 40 is directly connected to one surface of the drum 30 to directly drive the drum 30.

The shaft 43 may be perpendicular to the lower surface of the cabinet 10.

In the laundry treatment apparatus according to the present invention, a BLDC motor, which is commonly used in the technical field related to the laundry treatment apparatus, may be used as the power unit 40. The BLDC motor is well known, and therefore a detailed description thereof will be omitted.

Since the drum 30 is rotatably provided, vibration generated from the drum 30 may be transmitted to the tub 20, and the vibration transmitted to the tub 20 may be transmitted to the cabinet.

When the tub 20 vibrates, the tub 20 may be displaced in the leftward-rightward direction or in the upward-downward direction. As a result, the tub 20 may interfere with the cabinet 10, whereby noise may be generated or the tub may be damaged.

In order to prevent this, the laundry treatment apparatus according to the present invention may include a vibration unit for preventing the vibration of the tub 20 from being transmitted to the cabinet 10.

The vibration unit may include a first holder 51 provided at one surface of the cabinet 10, a second holder 53 provided at one surface of the tub 20, a connection unit 55 for connecting the first holder 51 and the second holder 53, and an elastic member 57 provided at one end of the connection unit 55 for providing an elastic force to the second holder 53 and the connection unit 55.

In addition, the connection unit 55 may include a first fixing part 551, provided at the other end of the connection unit 55 for preventing the connection unit 55 from being separated from the first holder 51, and a second fixing part 553, provided at one end of the connection unit 55 for preventing the connection unit 55 from being separated from the second holder 53.

The laundry treatment apparatus according to the present invention may include balancers 31 and 32 provided at at least one of the upper and lower parts of the drum 30 for preventing laundry received in the drum 30 from being unbalanced during the rotation of the drum 30.

As shown in FIG. 1, the upper balancer 31 may be provided at the upper part of the drum 30, and the lower balancer 32 may be provided at the lower part of the drum 30.

A conventional ball balancer or fluid balancer is configured such that, when laundry received in the drum 30 shakes, balls or fluid move passively in the opposite direction to solve unbalance, as previously described.

In the laundry treatment apparatus according to the present invention, however, the balancers 31 and 32 may effectively solve unbalance in a transient state as well as in a steady state.

More specifically, the laundry treatment apparatus according to the present invention may include active balancers 31 and 32 for sensing the vibration state of the drum 30 or the tub 20 to determine the position at which unbalance occurs and supplying water in the opposite direction to actively solve unbalance.

In the case in which the active balancers 31 and 32 are provided respectively at the upper and lower parts of the drum 30, however, material costs may be increased and production efficiency may be reduced. For this reason, the active balancer 31 or 32 may be provided at one of the upper and lower part of the drum 30, and a conventional ball balancer or fluid balancer may be provided at the other.

Since unbalance is effectively solved in the case in which the active balancers 31 and 32 are provided at both the upper and lower part of the drum 30, however, the laundry treatment apparatus according to the present invention will be described hereinafter on the assumption that the active balancers 31 and 32 are provided at both the upper and lower part of the drum 30.

The laundry treatment apparatus according to the present invention may further include a sensor unit for sensing the vibration state of the tub 20 or the drum 30 in order to solve unbalance.

The sensor unit may include a top sensor 81 provided at the top of the tub 20 for sensing the upward-downward vibration of the tub 20, an upper sensor 83 provided at the upper part of the side of the tub 20 for sensing the leftward-rightward vibration of the upper part of the tub 20, and a lower sensor 85 provided at the lower part of the side of the tub 20 for sensing the leftward-rightward vibration of the lower part of the tub 20.

More specifically, the sensors of the sensor unit may be optical sensors. The top sensor 81, the upper sensor 83, and the lower sensor 85 may sense the upward-downward distance between the top of the tub 20 and the top of the cabinet 10, the leftward-rightward distance between the upper part of the side of the tub 20 and the upper part of the side of the cabinet 10, and the leftward-rightward distance between the lower part of the side of the tub 20 and the lower part of the side of the cabinet 10, respectively, in real time to derive sinusoidal profiles.

Figure 2:
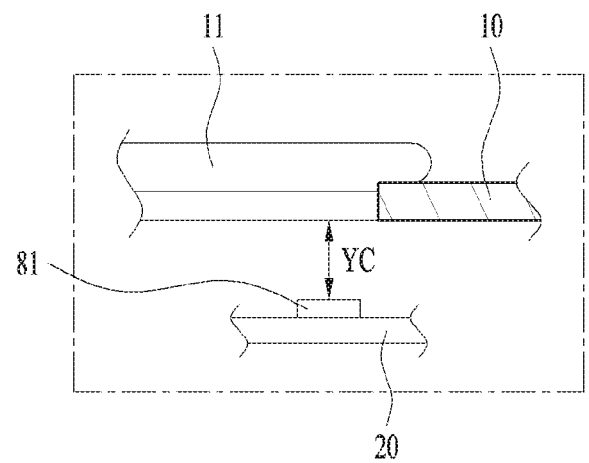
FIG. 2 is a view showing an example of a sensor unit provided in the present invention.
Figure 2:
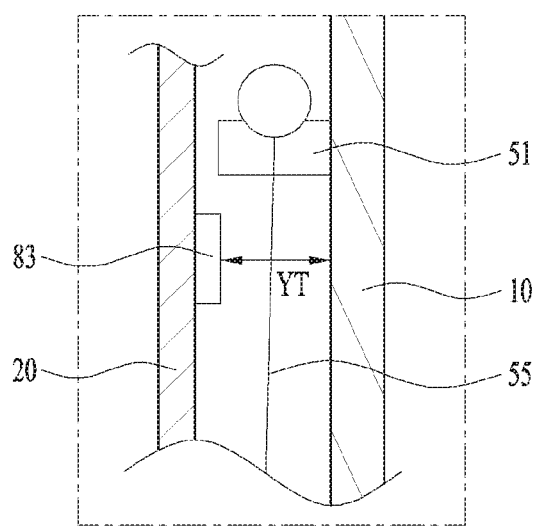
Figure 2:
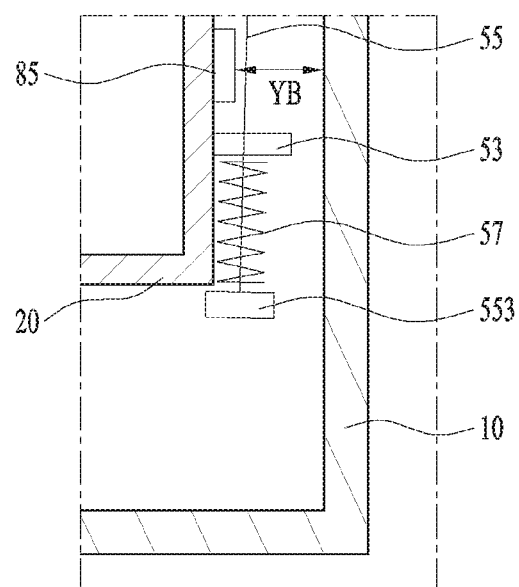

A controller (not shown) models the profiles sensed by the respective sensors of the sensor unit, determines at which part of the drum 30 unbalanced laundry is placed, and sprays water to the upper balancer 31 and the lower balancer 32 to solve the unbalance. FIG. 2 is a view showing an example of the sensor unit provided in the present invention.

Referring to FIG. 2(a), the laundry treatment apparatus according to the present invention may include a top sensor 81 provided at the top of the tub 20 for measuring the distance YC from the top of the tub 20 to the top of the cabinet 10.

Referring to FIG. 2(b), the laundry treatment apparatus according to the present invention may include an upper sensor 83 provided at the upper part of the side of the tub 20 for measuring the distance YT from the upper part of the side of the tub 20 to the upper part of the side of the cabinet 10.

Referring to FIG. 2(*c*), the laundry treatment apparatus according to the present invention may include a lower sensor 85 provided at the lower part of the side of the tub 20 for measuring the distance YB from the lower part of the side of the tub 20 to the lower part of the side of the cabinet 10.

The top sensor 81, the upper sensor 83, and the lower sensor 85 may be optical sensors.

The top sensor 81 senses the upward-downward vibration of the tub 20, and the upper sensor 83 and the lower sensor 85 sense the leftward-rightward vibration of the tub 20.

Since the upper sensor 83 and the lower sensor 85 sense the leftward-rightward vibration of the tub 20, it is possible to sense the position of laundry causing unbalance using only one of the upper and lower sensors.

However, in the case in which laundry is diagonally placed in the drum 30, whereby unbalance occurs, for example, in the case in which laundry is placed at the right upper part of the drum 30 and is also placed at the left lower part of the drum 30, unbalance may occur, with the result that unbalance occurs, whereby noise may be generated in the laundry treatment apparatus.

In order to prevent this, i.e. to solve unbalance through accurate control, therefore, the upper sensor 83 and the lower sensor 85 may be provided at the upper part and the lower part of the side of the tub 20, respectively.

Figure 3:
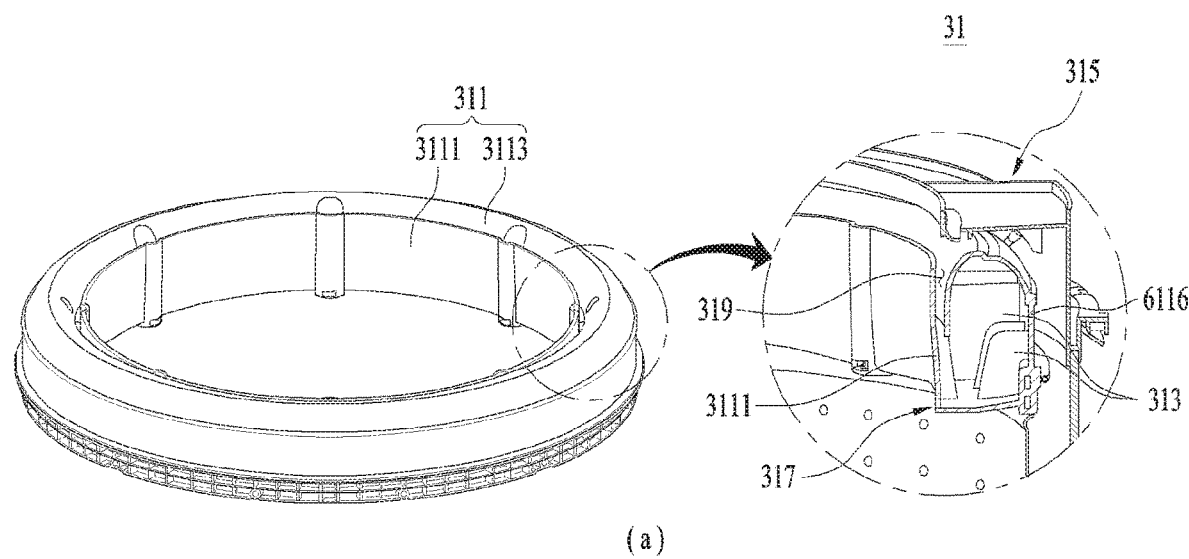
FIG. 3 is a view showing an example of an upper balancer provided in the present invention.
Figure 3:
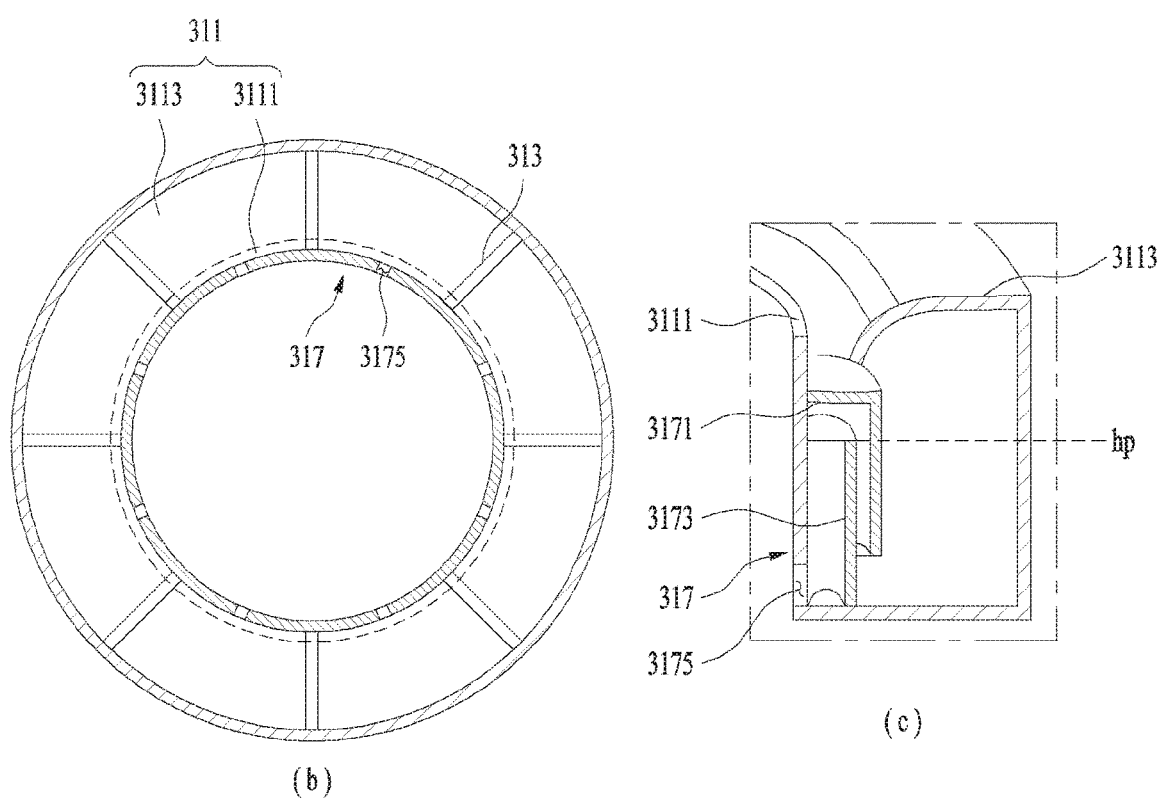

FIG. 3 is a view showing an example of the upper balancer provided in the present invention.

Referring to FIG. 3(*a*), the laundry treatment apparatus according to the present invention may include a hollow upper balancer 31 for solving unbalance occurring at the upper part of the drum 30.

The upper balancer 31 is configured to surround the upper part of the drum 30. Since laundry can be introduced into or withdrawn from the drum 30, the upper balancer 31 may have a hollow shape having an opening formed in the center thereof.

The upper balancer 31 may include an upper housing 311 defining a space for receiving water necessary to solve unbalance, a first partition unit 313 provided in the upper housing 311, a first water supply unit 315 for supplying water into the upper housing 311 to solve unbalance, and a first drainage unit 317 for draining the water from the upper housing 311 after the unbalance is solved.

The upper housing 311 may include a first upper housing 3111 defining the inner circumferential surface of the upper balancer 31 and a second upper housing 3113 defining the outer circumferential surface of the upper balancer 31.

More specifically, the section of the first upper housing 3111 may be formed in the vertical direction so as to define the inner circumferential surface of the upper balancer 31, and the section of the second upper housing 3113 may be formed so as to define the lower surface, the outer circumferential surface, and the upper surface of the upper balancer 31.

The upper surface of the second upper housing 3113 may be spaced apart from the first upper housing 3111 by a predetermined distance. Consequently, an upper inlet 319 is formed between the upper surface of the second upper housing 3113 and the first upper housing 3111.

The upper inlet is formed to provide a channel for supplying water to the upper balancer 31 in order to solve unbalance. In other words, a water supply channel may be defined by the upper inlet 319.

That is, the shape of the first upper housing 3111 and the second upper housing 3113 is not limited to that shown in FIG. 3, as long as the channel for supplying water to the upper balancer 31 is provided, as described above.

The shape of the first water supply unit 315 is not limited to that shown in FIG. 3 as long as water can be supplied into the upper housing 311.

The first drainage unit 317 may be provided at the lower end of the first upper housing 3111.

A plurality of first partition units 313 may be provided in the upper housing 311 to partition the interior of the upper housing 311.

In the laundry treatment apparatus according to the present invention, water may be supplied in the direction opposite the position of laundry during the rotation of the drum 30 in order to solve unbalance occurring in the drum 30.

If the water in the upper housing 311 is not drained after the unbalance is solved, additional unbalance may occur. In order to solve additional unbalance, the unbalance is solved during the rotation of the drum 30, the rotation of the drum 30 is stopped, and the water is drained from the upper housing 311 in the state in which the drum 30 is stopped.

Consequently, the first drainage unit 317 may be provided at the lower part of the inside of the upper housing 311, i.e. the lower part of the first upper housing 3111. That is, the first drainage unit 317 may be configured to drain the water received in the upper housing 311 in a direction that is perpendicular to the direction of gravity.

Since the upper balancer 31, the upper housing 311, and the water in the upper housing 311 perform circular motion during the rotation of the drum 30, a centrifugal force is radially applied outward from the center of rotation of the drum 30.

Consequently, the water in the upper housing 311 may solve unbalance without being drained due to the centrifugal force during the rotation of the drum 30. After the unbalance is solved, the rotation of the drum 30 may be stopped, and the water in the upper housing 311 may be drained into the drum through the first drainage unit 317.

A plurality of first partition units 313 may be provided in the upper housing 311 to partition the interior of the upper housing 311.

Referring to FIG. 3(*b*), the interior of the upper housing 311 is partitioned into 8 spaces by the first partition units 313. The number of spaces into which the upper housing 311 is partitioned by the first partition units 313 is not limited thereto. The number of first partition units 313 may be changed as needed as long as unbalance is solved.

In the laundry treatment apparatus according to the present invention, water may be supplied in the direction opposite the position of laundry in the state in which the drum 30 is temporarily stopped in order to solve unbalance occurring in the drum 30.

If the water in the upper housing 311 is not drained after the unbalance is solved, second unbalance may occur with the result that noise may be generated in the laundry treatment apparatus.

After the unbalance is solved in the state in which the drum 30 is temporarily stopped, the water may be drained from the upper housing 311 during the rotation of the drum 30 or in the state in which the drum is stopped again.

Consequently, the laundry treatment apparatus according to the present invention may be configured such that water is continuously supplied into the upper housing 311 after the unbalance is solved, and when the water is supplied up to a predetermined height, a siphon phenomenon, in which the water in the upper housing 311 is drained all at once, occurs.

More specifically, referring to FIG. 3(c), the first drainage unit 317 may include a hole 3175 for allowing communication between the opening formed in the center of the upper balancer 31 and the interior of the upper balancer 31, a first inner wall 3173 communicating with the opening formed in the center of the upper balancer 31 via the hole 3175, the first inner wall 3173 defining a pipe-shaped inner wall, and a first outer wall part 3171 formed so as to surround the first inner wall 3173 in the state of being spaced apart from the first inner wall 3173, the first outer wall part 3171 defining a pipe-shaped outer wall.

When the water supplied into the upper housing 311 reaches a predetermined height hp, the water may be discharged through the space between the first inner wall 3173 and the first outer wall part 3171, the space defined in the first inner wall 3173, and the hole 3175.

Meanwhile, when the water supplied into the upper housing 311 starts to be discharged, the water supplied into the upper housing 311 may be entirely discharged outside due to the difference between the pressure in the first inner wall 3173 and the pressure in the upper balancer 31. That is, the water in the upper housing 311 is drained all at once according to a siphon phenomenon.

Figure 4:
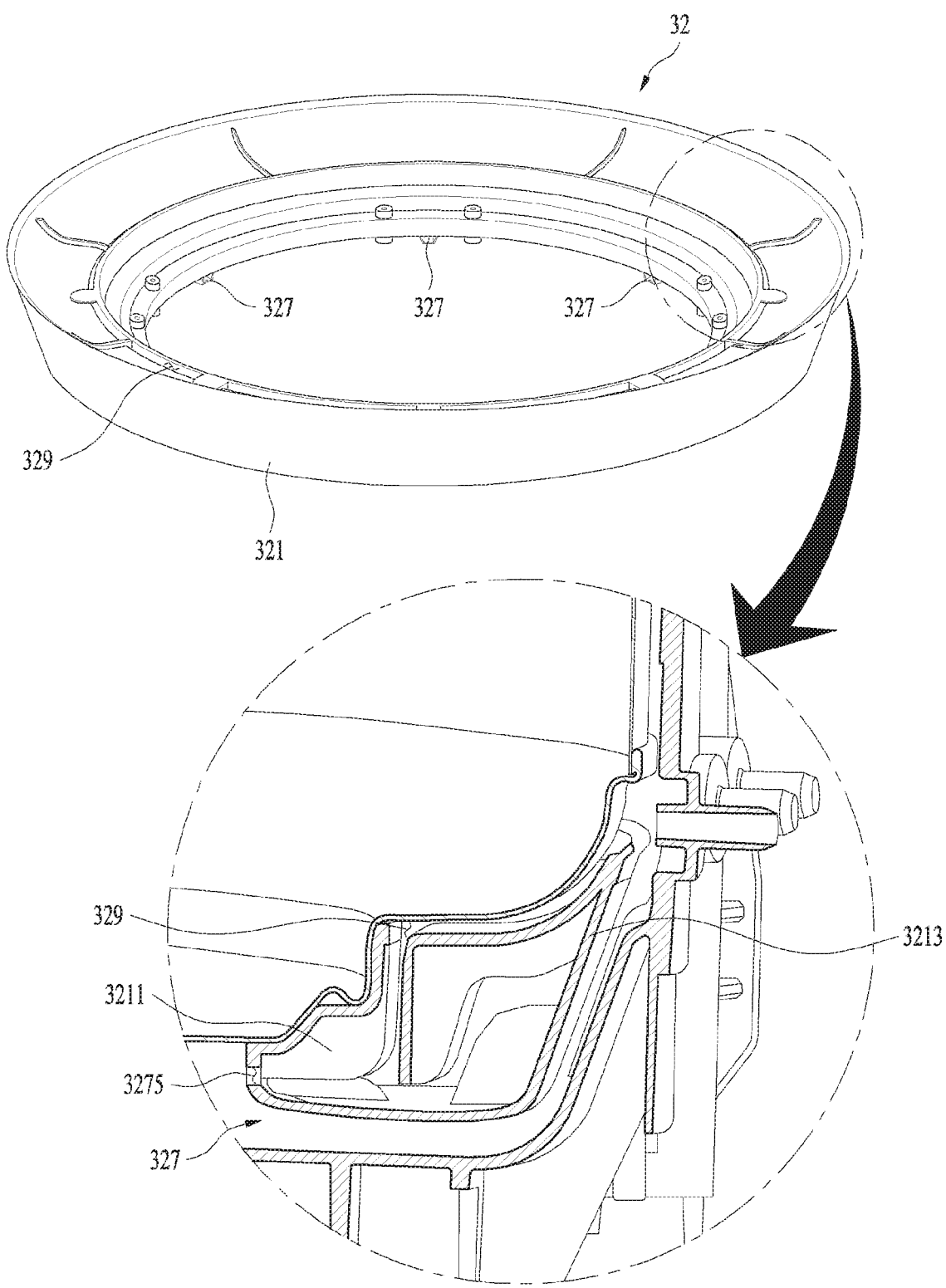
FIGS. 4, 5, and 6 are views showing an example of a lower balancer provided in the present invention.
Figure 5:
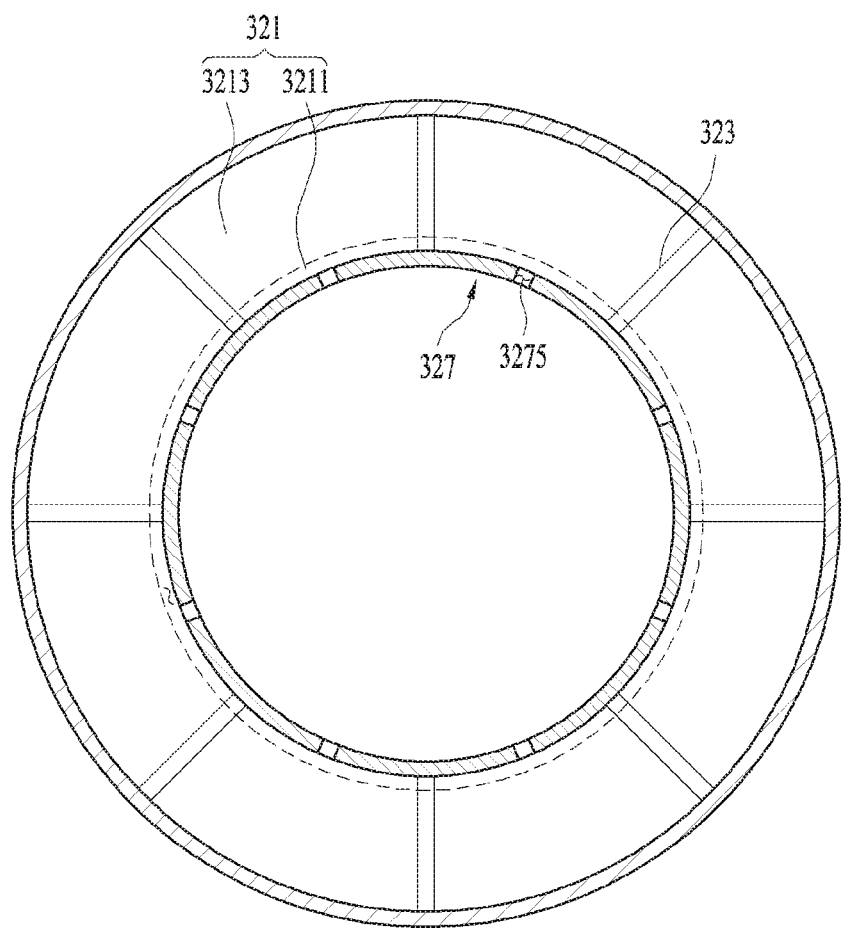
Figure 5:
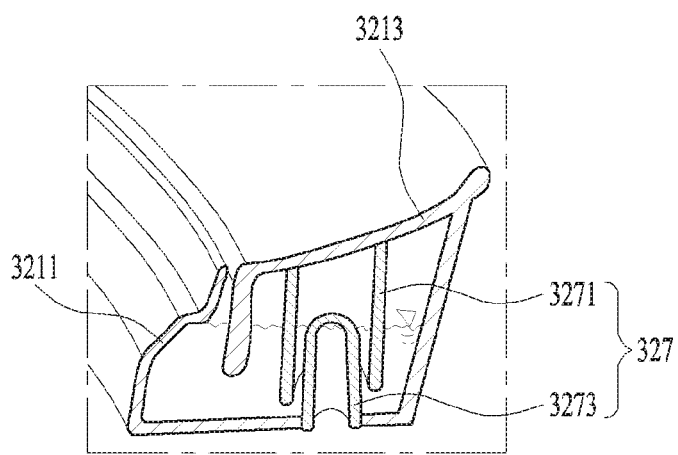
Figure 6:
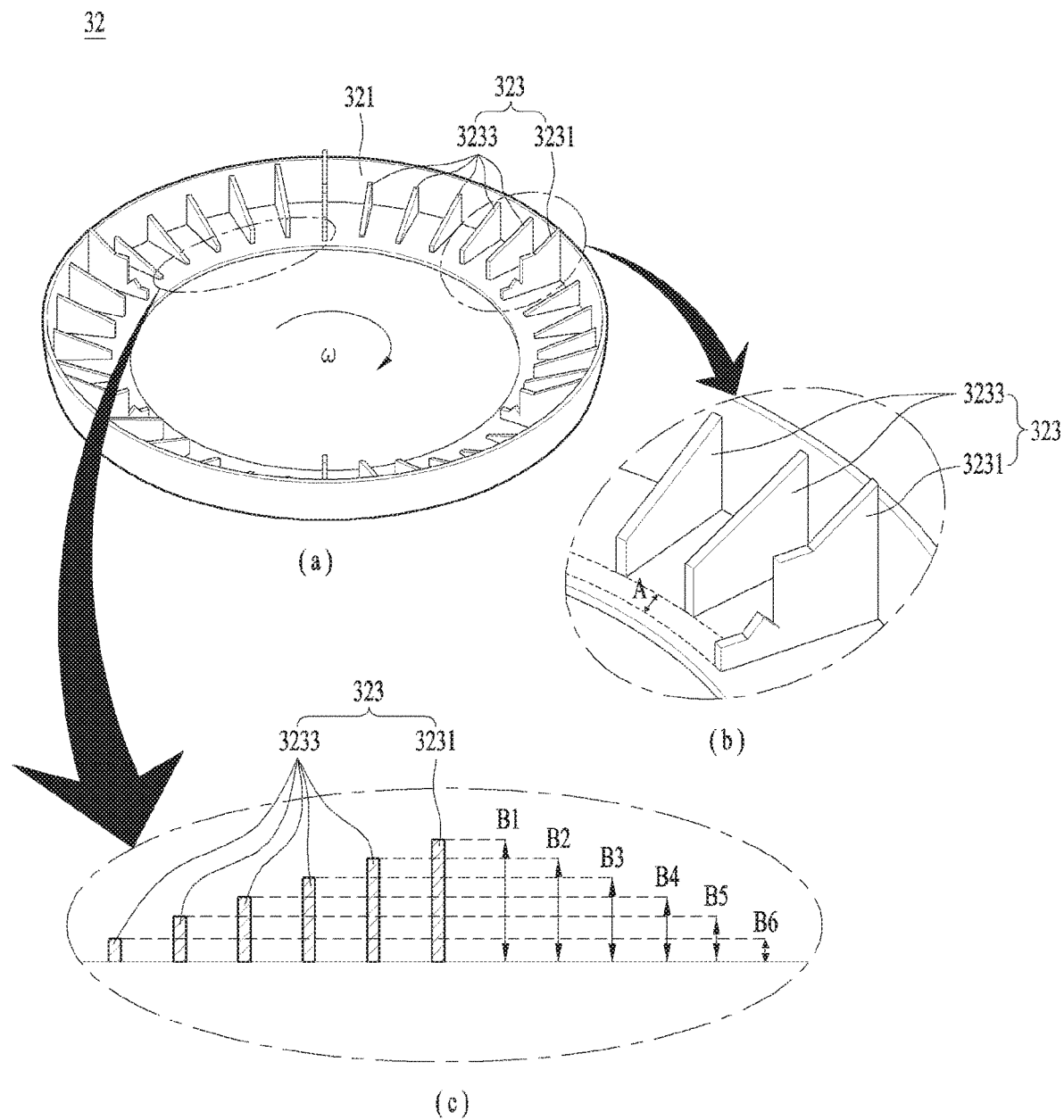

FIGS. 4, 5, and 6 are views showing an example of the lower balancer provided in the present invention.

Referring to FIG. 4, the laundry treatment apparatus according to the present invention may include a hollow lower balancer 32 for solving unbalance occurring at the lower part of the drum 30.

The laundry treatment apparatus according to the present invention may further include a power unit 40 for rotating the drum 30. The power unit 40 may be provided at the bottom of the drum 30. In order to prevent interference with the power unit 40, therefore, the lower balancer 32 may have a hollow shape having an opening formed in the center thereof.

The lower balancer 32 may include a lower housing 321 defining a space for receiving water necessary to solve unbalance, a second partition unit 323 provided in the lower housing 321, a second water supply unit 325 for supplying water into the lower housing 321 to solve unbalance, and a second drainage unit 327 for draining the water from the lower housing 321 after the unbalance is solved.

The lower housing 321 may include a first lower housing 3211 defining the inner circumferential surface of the lower balancer 32 and a second lower housing 3213 defining the outer circumferential surface of the lower balancer 32.

More specifically, the section of the first lower housing 3211 may be formed in the vertical direction so as to define the inner circumferential surface of the lower balancer 32, and the section of the second lower housing 3213 may be formed so as to define the lower surface, the outer circumferential surface, and the upper surface of the lower balancer 32.

The upper surface of the second lower housing 3213 may be spaced apart from the first lower housing 3211 by a predetermined distance. Consequently, a lower inlet 329 is formed between the upper surface of the second lower housing 3213 and the first lower housing 3211.

The lower inlet is formed to provide a channel for supplying water to the lower balancer 32 in order to solve unbalance. In other words, a water supply channel may be defined by the lower inlet 329.

That is, the shape of the first lower housing 3211 and the second lower housing 3213 is not limited to that shown in FIG. 4, as long as the channel for supplying water to the lower balancer 32 is provided, as described above.

The shape of the second water supply unit 325 is not limited to that shown in FIG. 4, as long as water can be supplied into the lower housing 321 without stopping the rotation of the drum 30 in the state in which the drum 30 is rotated.

The second drainage unit 327 may be provided at the lower end of the first lower housing 3211.

In the laundry treatment apparatus according to the present invention, water may be supplied in the direction opposite the position of laundry in the state in which the drum 30 is temporarily stopped in order to solve unbalance occurring in the drum 30, as previously described.

If the water in the lower housing 321 is not drained after the unbalance is solved, additional unbalance may occur. Consequently, the water in the lower housing 321 may be drained in the state in which the drum 30 is rotated at a very low rotational speed or in the state in which the drum 30 is stopped after the unbalance is solved. To this end, the second drainage unit 327 may be provided at the lower part of the inside of the lower housing 321, i.e. the lower part of the first lower housing 3211.

More specifically, the second drainage unit 327 may include a hole 3275 for allowing communication between the opening formed in the center of the lower balancer 32 and the interior of the lower balancer 32, a second inner wall 3273 communicating with the opening formed in the center of the lower balancer via the hole 3275, the second inner wall 3273 defining a pipe-shaped inner wall, and a second outer wall part 3271 formed so as to surround the second inner wall 3273 in the state of being spaced apart from the second inner wall 3273, the second outer wall part 3271 defining a pipe-shaped outer wall.

As shown in FIGS. 5(a) and 5(b), the second drainage unit 327 drains the water in the lower housing 321 according to a siphon phenomenon in the same manner as in the first drainage unit shown in FIGS. 3(b) and 3(c).

In other words, the second drainage unit 327 may be configured to drain the water received in the lower housing 321 in the direction of gravity.

A plurality of second partition units 323 may be provided in the lower housing 321 to partition the interior of the lower housing 321.

In addition, the second partition units 323 may extend in a direction that is perpendicular to the direction of gravity to partition the interior of the lower housing 321.

Referring to FIG. 5(a), the interior of the lower housing 321 is partitioned into 8 spaces by the second partition units 323. The number of spaces into which the lower housing 321 is partitioned by the second partition units 323 is not limited thereto. The number of second partition units 323 may be changed as needed as long as unbalance is solved.

The second partition units 323 provided in the lower balancer 32 will now be described with reference to FIG. 6. In FIG. 6, there is shown only the structure of the second partition units 323 provided in the lower balancer 32; however, this structure may equally apply to the upper balancer 31.

The second partition units 323 may include second main partitions 3231 for partitioning the interior of the lower housing 321 into a plurality of spaces and at least one second sub partition 3233 provided in each partitioned space.

Even in the case in which the second partition units 323 include only the second main partitions 3231, unbalance occurring in the laundry treatment apparatus according to the present invention may be solved.

Since the drum 30 is rotated, however, the water in the lower housing 321 is biased in the direction opposite the rotational direction of the drum due to the inertia thereof, whereby unbalance may not be efficiently solved.

In order to solve this problem, each of the upper balance 31 and the lower balancer 32 of the laundry treatment apparatus according to the present invention may include one or more second sub partitions 3233 provided between the respective second main partitions 3231 so as to have different heights.

More specifically, the heights of the second sub partitions 3233 may be sequentially increased in the rotational direction of the drum 30.

As a result, a phenomenon in which the water in the upper housing 311 or the lower housing 321 is biased due to the inertia thereof is prevented, whereby it is possible to more efficiently solve unbalance.

In FIG. 6, for example, there is shown an embodiment in which one second main partition 3231 and four second sub partitions 3233 are provided.

The four second sub partitions 3233 may have heights B5, B4, B3, and B2, which are sequentially increased, and the second main partition 3231 may have a height B1, which is the highest.

However, the number of second sub partitions 3233 is not limited thereto, and may be changed as needed.

The second main partitions 3231 are configured to partition the lower housing 321. However, the second sub partitions 3233 are configured not to partition the lower housing 321, since the second sub partitions 3233 are provided to prevent a phenomenon in which the water in the lower housing 321 is biased, as previously described.

That is, the second sub partitions 3233 are configured such that the water in the lower housing 321 can freely move between the respective second sub partitions 3233.

As shown in FIG. 6, therefore, the length of the lower surface of each second sub partition 3233 may be shorter than the length of the lower surface of each second main partition 3231 by A in the diametrical direction.

However, the difference between the length of the lower surface of each second main partition 3231 and the length of the lower surface of each second sub partition 3233 may be changed as needed. Consequently, the length difference is not limited to the ratio shown in FIG. 6.

Figure 7:
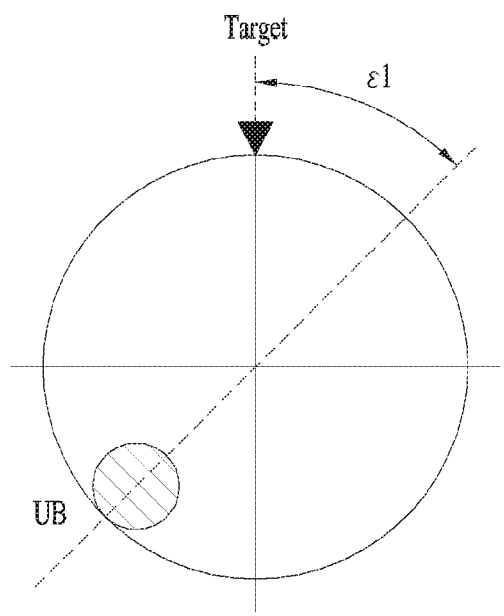
FIG. 7 is a view showing an example of a method of controlling unbalance occurring in the laundry treatment apparatus according to the present invention.
Figure 7:
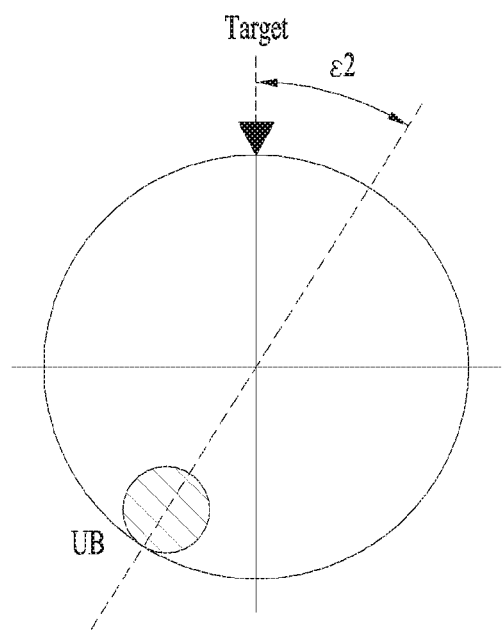
Figure 7:
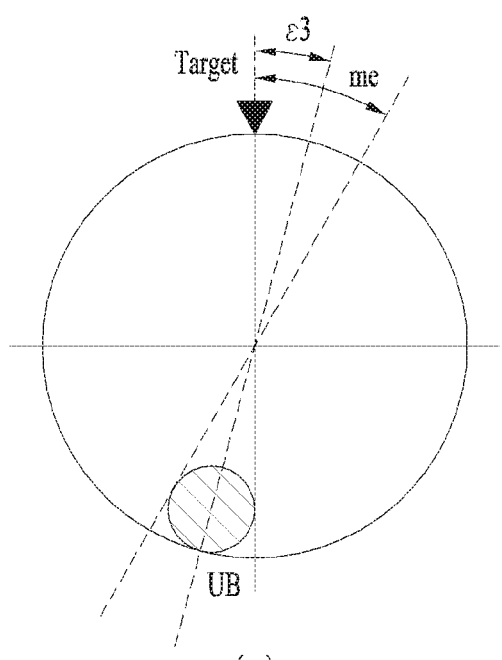

FIG. 7 is a view showing an example of a method of controlling unbalance occurring in the laundry treatment apparatus according to the present invention.

More specifically, there is shown a control method of deciding the position of the upper balancer 31 or the lower balancer 32 to which the water is supplied in response to unbalance occurring in the laundry treatment apparatus according to the present invention in order to more efficiently solve the unbalance.

As previously described, unbalance means the case in which mass distribution is not uniform in the circumferential direction of the drum 30 on the basis of the axis of rotation of the drum 30 during the rotation of the drum 30, which may mean that the drum 30 is rotated in the state in which laundry in the drum 30 is biased.

In the laundry treatment apparatus according to the present invention, the position at which laundry is biased is determined, and water is sprayed in the direction opposite the position at which the laundry is positioned on the basis of the axis of rotation of the drum 30 to solve unbalance. Since the laundry has its own mass and rotates together with the drum 30, an inertia error ε1 due to the inertia thereof is generated when primary control is performed, as shown in FIG. 7(*a*).

In order to overcome the inertia error ε1 generated when the primary control is performed, therefore, secondary control is performed in the state of reflecting a primary control value to compensate for the inertia error ε1 generated when the primary control is performed.

Even when secondary control is performed in the state of reflecting the inertia error ε1 generated when the primary control is performed, as shown in FIG. 7(*b*), a counter electromotive force error ε2 may be generated.

Counter electromotive force is electromotive force that is generated in an armature of a motor or a primary coil in a transformer in a direction opposite the direction in which electromotive force is generated in a power source.

That is, the secondary control is performed in the opposite direction in order to compensate for the inertia error ε1, but the counter electromotive force error ε2 is generated due to the counter electromotive force.

In the laundry treatment apparatus according to the present invention, therefore, tertiary control may be performed for more accurate control, as shown in FIG. 7(*c*).

The tertiary control may be performed to control the balancers 31 and 32 in the state of reflecting the counter electromotive force error ε2 generated when the secondary control is performed.

A residual error ε3 may be generated when the above control is performed. If the residual error ε3 is within a range of predetermined allowable error mε, it is possible to efficiently solve unbalance.

Figure 8:
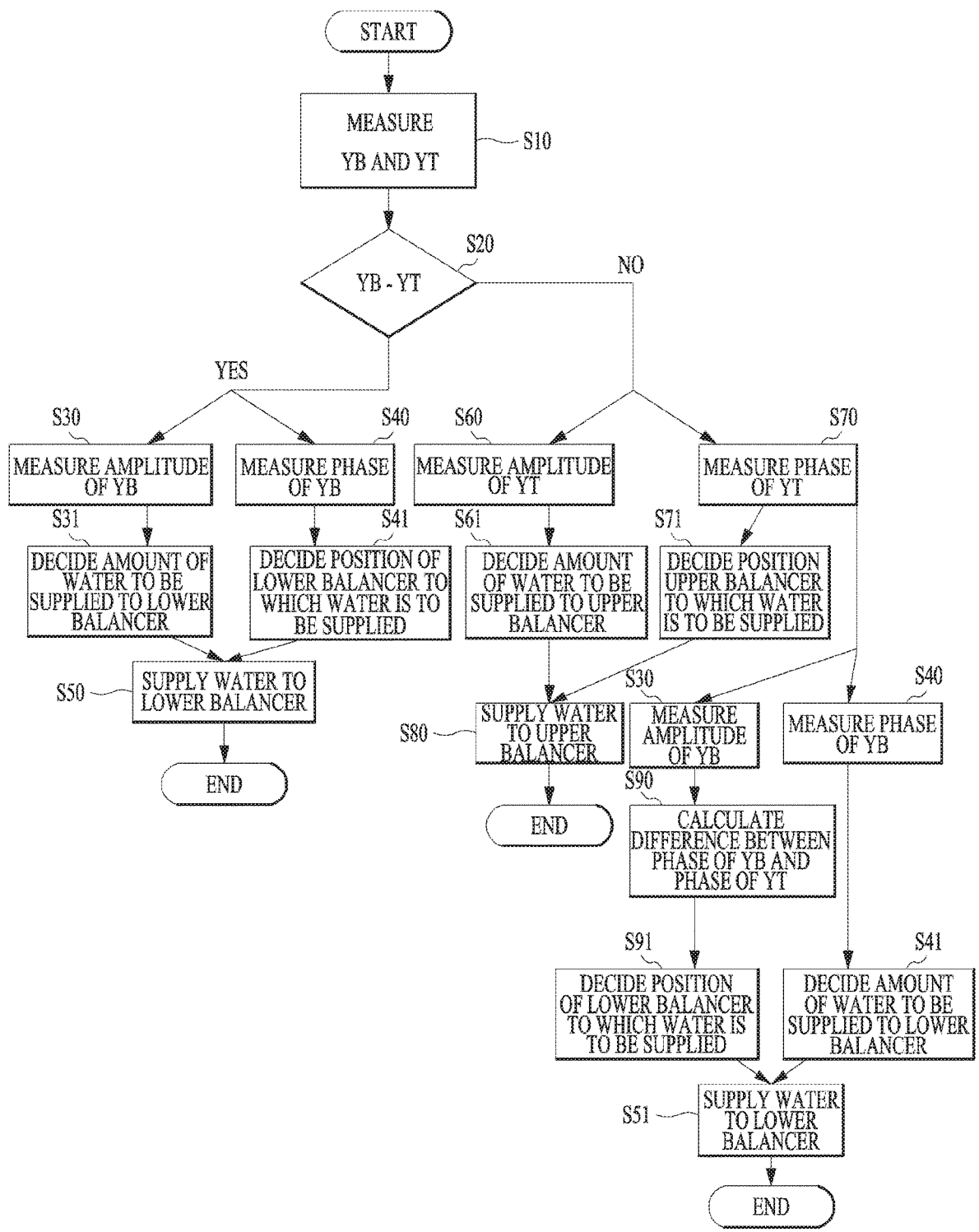
FIG. 8 is a flowchart showing an example of a control method of deciding the amount of water that is supplied to the upper balancer and the lower balancer provided in the laundry treatment apparatus according to the present invention and the position of the upper balancer and the lower balancer to which the water is supplied.

FIG. 8 is a flowchart showing an example of a control method of deciding the amount of water that is supplied to the upper balancer and the lower balancer provided in the laundry treatment apparatus according to the present invention and the position of the upper balancer and the lower balancer to which the water is supplied.

Referring to FIG. 8, the control method of the laundry treatment apparatus according to the present invention may include a distance measurement step (S10) of measuring an upper distance YT and a lower distance YB using the upper sensor 83 and the lower sensor 85, respectively, and a measurement comparison step (S20) of determining whether the upper distance YT and the lower distance YB, measured at the distance measurement step (S10), are equal to each other.

Upon determining at the measurement comparison step (S20) that the profiles of the upper distance YT and the lower distance YB are identical to each other, which means that the laundry in the drum 30 is not biased only to the upper part of the drum 30 or only to the lower part of the drum 30, i.e. the laundry is not biased diagonally when viewed from the front section of the drum 30, water may be supplied to only one selected from between the upper balancer 31 and the lower balancer 32 to solve unbalance.

In this embodiment, there is shown a control method in which water is supplied only to the lower balancer 32. However, the present invention is not limited thereto. Water may be supplied only to the upper balancer 31 as needed.

Upon determining at the measurement comparison step (S20) that the profiles of the upper distance YT and the lower distance YB are identical to each other, therefore, the control method of the laundry treatment apparatus according to the present invention may include a lower amplitude measurement step (S30) of measuring the amplitude of the lower distance YB from the profile of the lower distance YB and a lower phase measurement step (S40) of measuring the phase of the lower distance YB.

The control method of the laundry treatment apparatus according to the present invention may further include a lower water supply amount decision step (S31) of deciding the amount of water to be supplied to the lower balancer 32 based on the amplitude of the lower distance YB, measured at the lower amplitude measurement step (S30), and a first lower water supply position decision step (S41) of deciding the position of the lower balancer to which water is to be supplied based on the phase of the lower distance YB.

Subsequently, in the control method of the laundry treatment apparatus according to the present invention, a first lower balancer water supply step (S50) of supplying water to the lower balancer 32 based on the water supply amount and the water supply position, decided at the lower water supply amount decision step (S31) and the lower water supply position decision step (S41), may be performed to solve unbalance.

Upon determining at the measurement comparison step (S20) that the profiles of the upper distance YT and the lower distance YB are not identical to each other, which means that the laundry is biased diagonally when viewed from the front section of the drum 30, water may be supplied to both the upper balancer 31 and the lower balancer 32 to solve unbalance.

That is, water is supplied to both the upper balancer 31 and the lower balancer 32, unlike the first lower balancer water supply step (S50). Since the upper balancer 31 and the lower balancer 32 are provided at the upper part and the lower part of the drum 30 so as to be rotatable integrally with the drum 30, these balancers are coupled to each other. In the case in which water is supplied merely based on the amplitudes and phases of the profiles of the upper distance YT and the lower distance YB, therefore, unbalance is not solved.

In other words, the phase of the profile of the upper distance YT, used to control the upper balancer 31, must be applied to control the lower balancer 32.

Upon determining at the measurement comparison step (S20) that the profiles of the upper distance YT and the lower distance YB are not identical to each other, therefore, the control method may include an upper amplitude measurement step (S60) of measuring the amplitude of the upper distance YT, an upper water supply amount decision step (S61) of deciding the amount of water to be supplied to the upper balancer 31 based on the measured amplitude of the upper distance, an upper phase measurement step (S70) of measuring the phase of the upper distance YT, an upper water supply position decision step (S71) of deciding the position of the upper balancer 31 to which water is to be supplied based on the measured phase of the upper distance, and an upper balancer water supply step (S80) of supplying the amount of water to be supplied, decided at the upper water supply amount decision step (S61), to the water supply position, decided at the upper water supply position decision step (S71).

In addition, the control method may further include a lower balancer water supply amount decision step (S31) of deciding the amount of water to be supplied to the lower balancer based on the amplitude of the lower distance YB, measured at the lower amplitude measurement step (S30) of measuring the amplitude of the lower distance, a phase difference calculation step (S90) of calculating the difference between the phase of the lower distance, measured at the lower phase measurement step (S40) of measuring the phase of the lower distance, and the phase of the upper distance, measured at the upper phase measurement step (S70) of measuring the phase of the upper distance, a second lower water supply position decision step (S91) of deciding the position of the lower balancer to which water is to be supplied using the difference between the phase of the upper distance and the phase of the lower distance, calculated at the phase difference calculation step (S90), and a second lower balancer water supply step (S51) of supplying the amount of water to be supplied, decided at the lower water supply amount decision step (S31), to the water supply position, decided at the second lower water supply position decision step (S91).

Figure 9:
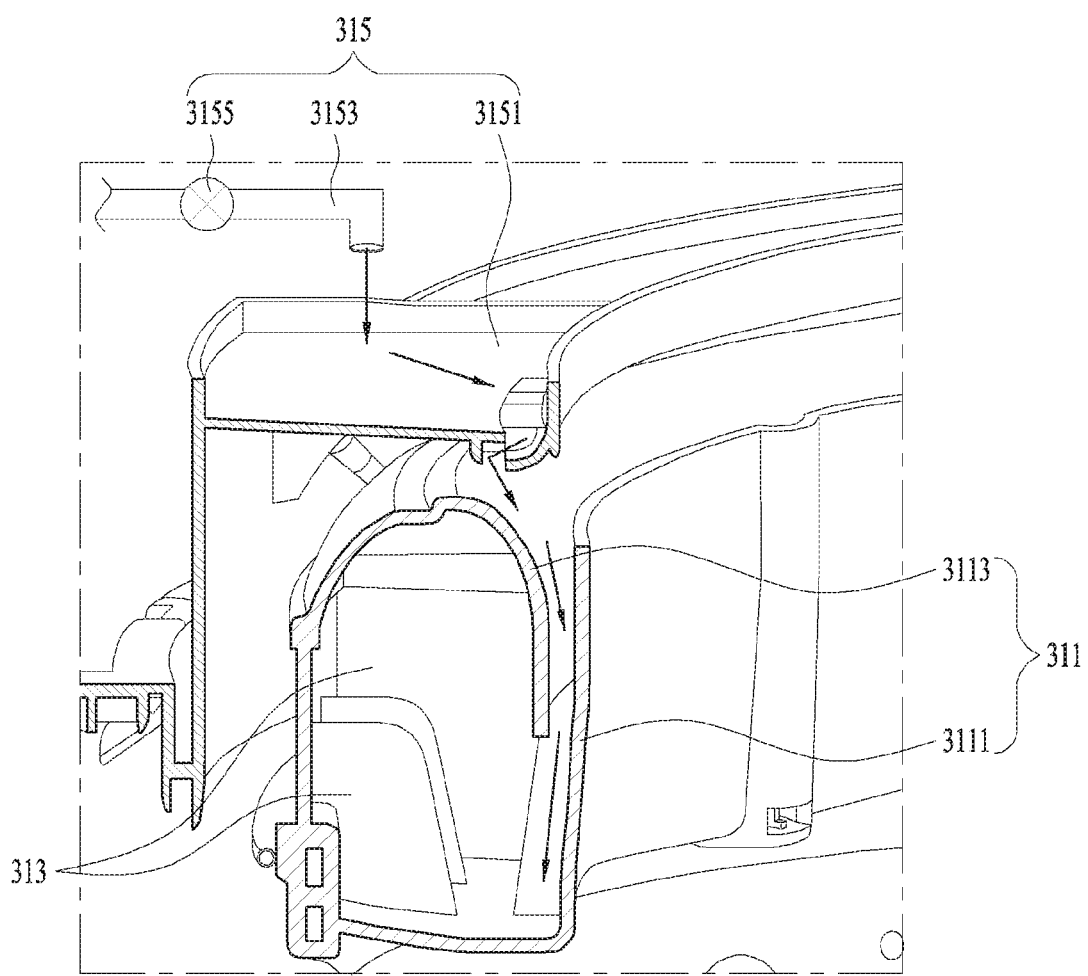
FIGS. 9 and 10 are views showing an example of water supply units provided in the upper balancer and the lower balancer for supplying water thereto.
Figure 10:
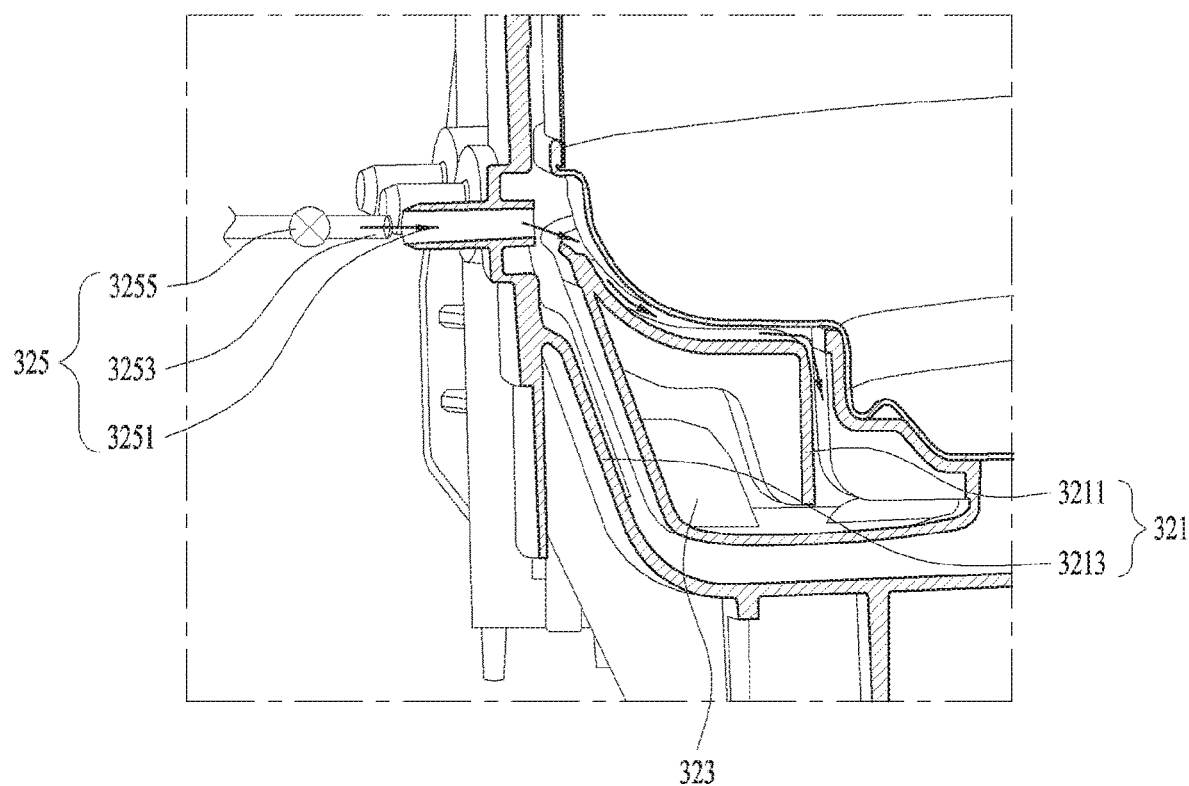

FIGS. 9 and 10 are views showing an example of water supply units provided in the upper balancer and the lower balancer for supplying water thereto.

Referring to FIG. 9, the laundry treatment apparatus according to the present invention may further include a first water supply unit 315 for supplying water to the upper balancer 31 in the state in which the drum 30 is stopped.

The first water supply unit 315 may include a first water supply hose 3153 for supplying water into the upper balancer 31 in the state in which the drum 30 is stopped, a first water supply guide 3151 for guiding the water from the first water supply hose 3153 into the upper housing 311, and a first water supply valve 3155 for controlling the amount of water that is supplied from the first water supply hose 3153.

The water from the first water supply unit 315 moves into the upper housing 311. More specifically, the upper housing 311 may include a first upper housing 3111 and a second upper housing 3113, which are spaced apart from each other by a predetermined distance, and the water from the first water supply unit 315 may be supplied into the upper housing 311 through a channel defined between the first upper housing 3111 and the second upper housing 3113.

The first water supply unit 315 may be provided separately, or may be provided at the water supply unit 70. Furthermore, the first water supply unit 315 may communicate with a branch pipe (not shown) diverging from the water supply unit 70.

Referring to FIG. 10, the laundry treatment apparatus according to the present invention may further include a second water supply unit 325 for supplying water to the lower balancer 32 in the state in which the drum 30 is stopped.

The second water supply unit 325 may include a second water supply hose 3253 for supplying water into the lower balancer 32 in the state in which the drum 30 is stopped, a second water supply guide 3251 for guiding the water from the second water supply hose 3253 into the lower housing 321, and a second water supply valve 3255 for controlling the amount of water that is supplied from the second water supply hose 3253.

The water from the second water supply unit 325 moves into the lower housing 321. More specifically, the lower housing 321 may include a first lower housing 3211 and a second lower housing 3213, which are spaced apart from each other by a predetermined distance, and the water from the second water supply unit 325 may be supplied into the lower housing 321 through a channel defined between the first lower housing 3211 and the second lower housing 3213.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:
1. A laundry treatment apparatus comprising:
a cabinet having a door;
a tub provided in the cabinet to store wash water;
a drum rotatably provided in the tub to receive laundry;

a balancer which is configured to rotate integrally with the drum, the balancer being configured such that water is supplied into a portion of the balancer to maintain a dynamic balance of the drum;
a water supply to provide water to the balancer;
a sensor to detect an imbalance of the drum; and
a controller that causes water to be selectively supplied to the portion of the balancer to counter the imbalance of the drum,
wherein the balancer includes a drainage path that siphons water from the balancer when an upper surface of water in the drainage path is above a predetermined water level.

2. The laundry treatment apparatus according to claim 1, wherein the balancer is provided at one of an upper edge or a lower edge of the drum.

3. The laundry treatment apparatus according to claim 1, wherein the balancer further includes:
a housing defining an interior to store water;
a partition that divides the interior of the housing into a plurality of spaces; and
an inlet provided in the housing and through which water is introduced into the housing.

4. The laundry treatment apparatus according to claim 3, wherein the partition includes:
main partitions provided to divide the interior of the housing into the spaces; and
one or more sub partitions provided in one of the spaces between a pair of the main partitions the one or more sub partitions preventing a biasing of water in the housing due to a rotation of the drum.

5. The laundry treatment apparatus according to claim 4, wherein a plurality of the sub partitions are provided, and respective heights of the sub partitions increase in a rotational direction of the drum.

6. The laundry treatment apparatus according to claim 3, wherein the partition extends in a direction that is perpendicular to a direction of gravity to partition the interior of the housing.

7. The laundry treatment apparatus according to claim 1, wherein the drainage path includes:
an outer wall having a closed upper surface and an open lower surface; and
an inner wall having a closed upper surface and an open lower surface.

8. The laundry treatment apparatus according to claim 1, wherein the water supply includes:
a water supply hose provided to supply water when the balancer is stopped;
a water supply valve that controls an amount of water that is supplied from the water supply hose; and
a water supply guide surface provided to guide the water from the water supply hose into the balancer.

9. The laundry treatment apparatus according to claim 8, wherein the water supply hose is provided so as to communicate with a wash water supply that supplies wash water to the tub.

10. The laundry treatment apparatus according to claim 1, further comprising an additional balancer having liquid or a ball therein, the balancer being provided in one of an upper edge or a lower edge of the drum, and the additional balancer being provided in another one of the upper edge or the lower edge of the drum.

11. The laundry treatment apparatus according to claim 1, wherein an axis of rotation of the drum is perpendicular to a lower surface of the cabinet.

12. The laundry treatment apparatus according to claim 1, wherein the drainage path is configured to drain the water from the balancer in a direction that is parallel to a direction of gravity.

13. The laundry treatment apparatus according to claim 1, further comprising:
a motor that provides a rotational force; and
a shaft rotatably provided at the motor, the shaft being provided in a direction that is parallel to a direction of gravity and being directly connected to one surface of the drum to rotate the drum.

14. The laundry treatment apparatus according to claim 1, further comprising:
a vibration dampener provided to reduce vibrations of the tub, wherein the vibration dampener includes:
a first holder provided at one surface of the cabinet;
a second holder provided at one surface of the tub;
a connector provided to connect the first holder and the second holder; and
an elastic member provided at the connector to provide an elastic force.

15. The laundry treatment apparatus according to claim 1, wherein the balancer includes:
an upper balancer provided at an upper edge of the drum; and
a lower balancer provided at a lower edge of the drum.

16. The laundry treatment apparatus according to claim 1, wherein the sensor includes:
a first sensor that detects a first distance between a top surface of the tub and a top surface of the cabinet; and
a second sensor that detects a second distance between a side surface of the tub and a side surface of the cabinet.

17. A laundry treatment apparatus comprising:
a cabinet having an opening;
a door to open and close the opening;
a tub provided in the cabinet to store wash water;
a drum rotatably provided in the tub to receive laundry through the opening;
a water supply to provide water;
a balancer coupled to the drum;
a sensor to detect an imbalance of the drum; and
a controller that causes water to be selectively supplied to the portion of the balancer to counter the imbalance of the drum,
wherein the balancer includes:
a housing having an interior space;
a partition that divides the interior space of the housing into a plurality of spaces; and
an inlet provided in the housing and through which water is introduced into one or more of the spaces by the water supply.

18. The laundry treatment apparatus according to claim 17, wherein the balancer further includes sub-partitions provided in each of the spaces, respective heights of the sub partitions in each of the spaces increasing in a rotational direction of the drum.

19. The laundry treatment apparatus according to claim 17, wherein the balancer further includes a drainage path that siphons water from the balancer when the drum stops rotating.

20. The laundry treatment apparatus according to claim 17, wherein the sensor includes:
a first sensor that detects a first distance between a top surface of the tub and a top surface of the cabinet; and a second sensor that detects a second distance between a side surface of the tub and a side surface of the cabinet.

* * * * *